United States Patent [19]

Caldwell

[11] 4,034,639

[45] July 12, 1977

[54] SOUND-DAMPED SAW BLADE

[75] Inventor: Donald B. Caldwell, Lake Elmo, Minn.

[73] Assignee: Minnesota Mining and Manufacturing Company, St. Paul, Minn.

[21] Appl. No.: 723,790

[22] Filed: Sept. 16, 1976

[51] Int. Cl.² .......................................... B27B 33/08
[52] U.S. Cl. ..................................... 83/835; 83/676
[58] Field of Search ...................... 83/835, 837, 676

[56] References Cited

U.S. PATENT DOCUMENTS

| 3,799,025 | 3/1974 | Tsunoda | 83/835 |
| 3,812,755 | 5/1974 | Danielsen | 83/835 |
| 3,990,338 | 11/1976 | Wikner et al. | 83/835 |

Primary Examiner—Willie G. Abercrombie
Attorney, Agent, or Firm—Cruzan Alexander; Donald M. Sell; James V. Lilly

[57] ABSTRACT

A sound-damped saw blade comprising (a) a disc, (b) a viscoelastic material adhered to one major surface of the disc and a thin sheet over and coextensive with said viscoelastic layer, and (c) an edge coating covering the circumferential edge of said viscoelastic layer and said sheet, wherein said coating has an abrasion resistance, as expressed in percentage haze, of less than about 30 percent.

8 Claims, 2 Drawing Figures

SOUND-DAMPED SAW BLADE

BACKGROUND OF THE INVENTION

The present invention relates to sound-damped saw blades. More particularly it relates to sound-damped saw blades employing a viscoelastic damping layer on one major face thereof.

Sound-damped saw blades of the type employing a viscoelastic damping layer have been previously described. See for example U.S. Pat. No. 3,799,025. Generally such blades employ a rigid sheet over the viscoelastic layer, the combination often being referred to as a constrained-layer damping device.

Constrained-layer damping devices have been quite effective in substantially damping the vibration responsible for the loud and objectionable whine or sound emitted from circular saw blades during operation. However, saw blades employing such devices have not proven entirely satisfactory in use in the lumber and wood products industry. For example, wood pitch quickly builds up at the peripheral edge of the constrained-layer damping device where the viscoelastic layer meets the saw blade. As a result, the thickness of the edge increases and eventually causes the damped blade to bind during normal use. This in turn causes the damping device to be torn away from the blade. Additionally, the resonant vibration encountered during use of the blade causes the damping device to repeatedly strike the material being cut. The combination of the rotation of the blade and this striking action causes the exposed edge of the damping device to dig into the side of the cut being made and raise the device from the blade. Moreover the rigid sheet of such devices has sharp corners on its exposed surfaces. This increases the tendency of such devices to dig into the side of any cut being made.

The present invention overcomes these disadvantages of the prior art by providing an abrasion-resistant edge coating around the edge of the constrained-layer damping device. Despite being highly resistant to abrasion the edge coating provides a lubricious surface to those materials being cut by the sound-damped saw blade. The novel edge coating seals the edge of the constrained layer damping device, prevents the build up of wood pitch at said edge and prevents the edge from being torn away from the blade. Consequently the improved sound-damped saw blades exhibit increased useful life. Moreover, in a particularly preferred aspect of the invention, the constrained layer damping device is provided with a tapered shoulder at its outer circumference.

SUMMARY OF THE INVENTION

In accordance with the present invention there is provided a sound-damped saw blade comprising (a) a disc, (b) a layer of viscoelastic material adhered to one major surface of said disc and a thin sheet over and coextensive with said viscoelastic material, wherein the diameter of said viscoelastic layer and said sheet is less than the diameter of said disc, and (c) an edge coating covering the circumferential edge of said viscoelastic layer and said sheet, which edge coating has an abrasion resistance, as expressed in percentage haze, of less than about 30 percent.

SUMMARY OF THE DRAWINGS

The invention is described in more detail hereinafter with reference to the accompanying drawings, wherein like reference characters refer to the same elements in the several views and in which.

DETAILED DESCRIPTION OF THE INVENTION

Figure 1:
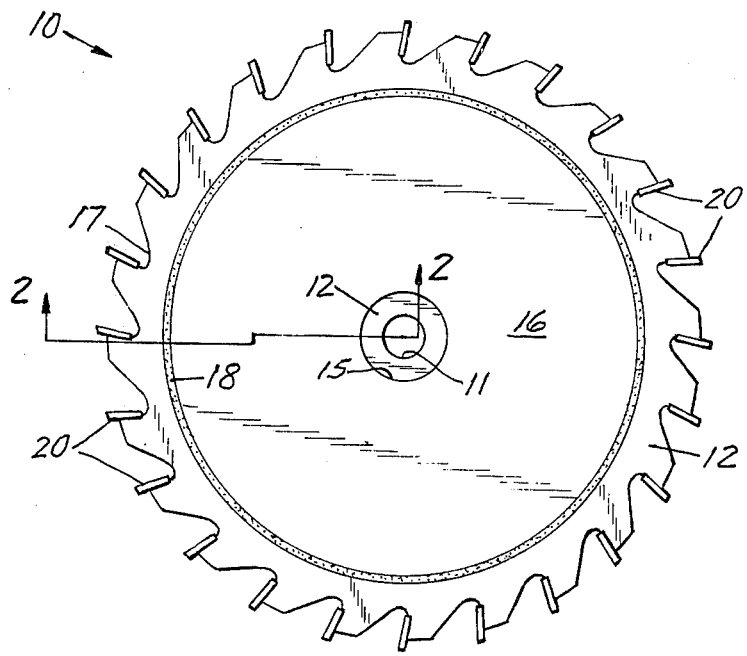
FIG. 1 is a plan view of a sound-damped saw blade employing the improvement of the present invention.
Figure 2:
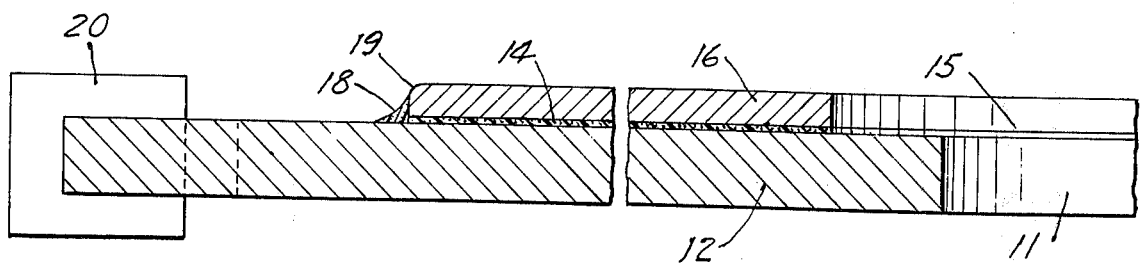
FIG. 2 is a cross-sectional view of the saw blade of FIG. 1 along the line 2—2.

Referring now to the drawings there is shown a sound-damped saw blade 10 comprising a disc 12, a layer 14 of viscoelastic material (see FIG. 2), a thin sheet 16 over layer 14 and an edge coating 18 covering the circumferential edge of layer 14 and sheet 16.

In the embodiment shown, disc 12 perferably comprises a metal such as steel. While metals are preferred for disc 12, other materials may also be used provided that they are suitable for use in saw blades.

Layer 14 comprises a viscoelastic material having a central opening 15 therethrough. Preferably opening 15 is larger in diameter than hole 11 in disc 12. The diameter of layer 14 is limited by the deepest gullet 17, or other slot in disc 12. Thus it is preferred that layer 14 not extend into said gullet or slot. Preferably layer 14 is from about 0.02 to 0.1 millimeters thick.

The viscoelastic material employed in layer 14 should have a glass transition temperature between +5° and −50° C (preferably between 0° and −20° C). Additionally it should have a loss tangent of at least about 0.3 (preferably at least about 0.8) and a dynamic shear storage modulus of from about $1 \times 10^7$ to $1 \times 10^9$ dynes/cm$^2$ each when measured at about 20° C and a frequency in the range of about 500 to 5000 hertz.

The foregoing requirements for the viscoelastic layer are attainable with various polymeric materials. A particularly preferred viscoelastic layer comprises copolymers of alkylacrylate and one or more copolymerizable acrylic monomers such as acrylic acid, methacrylic acid, acrylonitrile, methacrylonitrile, acrylamide and methacrylamide. The alkyl acrylate may be a single monomer having from about 6 to 10 carbon atoms in its alkyl group which is not highly branched, that is, more than half of the alkyl carbon atoms are in a straight chain terminating at the oxygen bridge. In the event that the alkyl acrylate is a mixture of monomers, the alkyl group should have an average of about 6 to 10 carbons, and less than half of the alkyl groups should be highly branched.

A particularly preferred composition of this latter type comprises from about 80 to 95 parts by weight of alkyl acrylate and, correspondingly, from about 20 to 5 parts by weight of one or more of the named copolymerizable acrylic monomers. Most preferably the composition comprises 90 parts by weight of the alkyl acrylate and 10 parts by weight of one or more of the named copolymerizable acrylic monomers. Thus, an example of a particularly preferred viscoelastic layer comprises 90 parts by weight isooctyl acrylate and 10 parts by weight acrylic acid.

Other materials useful in viscoelastic layer 14 comprise a mixture of a polymeric material and a plasticizer. For example, a composition of 100 parts by weight polyvinyl chloride and about 50 parts by weight plasticizer ("Paraplex" G-25[1]) is suitable. Other suitable viscoelastic layers may be prepared from polymers such as polyurethanes and polymethacrylates, when properly plasticized.

[1] Understood to be a polyester of essentially equal molar proportions of 1,2-propylene glycol and sebacic acid, said polyester having a number average molecular weight as determined by the vapor pressure method of about 5300 and an acid number of about 1.5, commercially available from Rohm and Haas.

Sheet 16 is provided over layer 14 and is coextensive therewith. Said sheet, sometimes referred to hereinafter as the constraining layer, acts in concert with layer 14 to reduce the noise generated by the saw blade during use. Thus, resonant vibration encountered during use causes disc 12 and sheet 16 to bend and apply a shear force to viscoelastic layer 14 thereby deforming said layer. As a result the molecules in the viscoelastic layer tend to become extended. However, the molecules also tend to resist extension by neighboring molecules so that at least a portion of the vibrational energy is absorbed and transformed into heat. This, of course, reduces the noise generated by the saw blade.

Sheet 16 may be constructed from a variety of materials. Preferably the sheet comprises a metal, such as steel, and most preferably tin-plated cold-rolled steel. It is also preferred that the thermal conductivity of sheet 16 be approximately the same as that of disc 12.

It is further preferred for layer 14 and sheet 16 to be of a thickness such that they do not extend upward from disc 12 any further than do the edges of cutting tips 20. This is highly preferred because layer 14 and sheet 16 can enter the cut being made with the saw. Thus sheet 16 is preferably about 0.3 millimeters thick.

In a particularly preferred embodiment of the invention, sheet 16 is provided with a tapered edge 19. As discussed above the vibrations set up in the blade during use cause the damping device to strike the material being cut. Tapered edge 19 is particularly resistant to being damaged by such impacting.

Edge coating 18 is provided around the circumferential edge of layer 14 and sheet 16. Useful edge coatings 18 have an abrasion resistance, as expressed in percentage haze of less than about 30 percent. Said percentage haze is that haze produced on a sample of cured edge coating 18 on a clear colorless polyester film by the falling sand method of test for abrasion resistance. This procedure is the same as that of ASTM Designation D968-51 (Reapproved 1972) with the modification that the specimen platform is rotated at about 60 rpm during the test. Percentage haze produced in the specimen is measured using a Gardner Hazometer (manufactured by Gardner Laboratory Inc., Bethesda, Maryland) in accordance with ASTM Designation D1003-64 (Procedure A) (Reapproved 1970).

Useful coatings 18 also exhibit no removal when tested according to a tape adhesion test. In this test a thin film (e.g., about 0.025 millimeters) of the edge coating material is applied to a section of tin-plated cold-rolled steel and cured. Two parallel scratches are made through the coating and into the steel. The scratches are about 25 cm apart. A 2.5 cm wide by 7.5 cm long piece of masking tape (Code No. 250 from Minnesota Mining and Manufacturing Company) is pressed onto the surface and intersects the scratches at right angles. A 2 kg rubber covered roller is used to press the tape down. The tape is then abruptly removed and the test area examined for any removal of the coating.

A variety of materials are useful as edge coatings 18. Preferably they are room-temperature (e.g., about 22° C) curable compounds or compositions. Representative examples of materials useful as edge coatings 18 include polyurethanes, polystyrene, fluorocarbons, epoxies and silicone polymers. Preferred materials include epoxies and silicone compositions.

Epoxy materials preferred for use in the present invention may generally be classified as room-temperature curing compositions which cure to a tough state in a short period of time and which have a good pot life.

A particularly useful epoxy composition comprises a two part system of (a) epoxy resin and (b) an amino-terminated polyamide of (i) a polycarboxylic acid and (ii) a compound of the formula

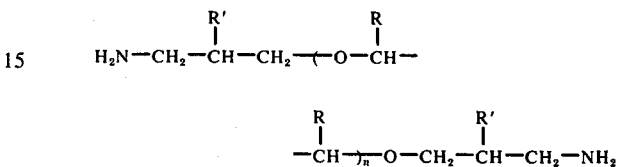

wherein $n$ is an integer of 1 to about 40, $R'$ is selected from the group consisting of hydrogen and methyl, each $R$ is selected from the group consisting of hydrogen and alkyl, and any two $R$'s attached to adjoining carbon atoms together contain a total of about 4 carbon atoms. The polyamide should be present in said mixture in an amount sufficient to provide about 0.03 to 0.8 amino ($NH_2$) group per oxirane group of the epoxy resin, i.e., in approximately equivalent amounts, when no other hardener is present.

Preferably the epoxy resin employed in the composition is a polyglycidyl ether. Among those which have demonstrated utility are condensation products of bisphenol A and epichlorohydrin such as "Epon 828" (epoxide equivalent weight of 175-210, commercially available from Shell Chemical Company); and "DER 331" (epoxide equivalent weight of from about 180-200, commercially available from Dow Chemical Company). Other useful epoxy resins may be similarly prepared, e.g., by substituting other polyols such as glycerol or resorcinol for the bisphenol A.

Another class of epoxy resin useful in the present invention are epoxidized novolac resins such as "DEN 438" (epoxide equivalent weight of about 180, commercially available from Dow Chemical Company). These epoxy resins are characterized by phenyl groups linked by methylene bridges with epoxy groups pendent to the phenyl groups.

Still another epoxy resin useful in the present invention comprises the condensation product of 1,1,2,2-tetrakis(4-hydroxyphenol)ethane and epichlorohydrin. Such an epoxy resin is commercially available as "Epon 1310" from Shell Chemical Company. It is understood to have an average of about 3 glycidyl ether groups in the molecule and a Durrans' melting point of about 77°-80° C and an epoxide equivalent weight of about 200.

The amino-terminated polyamide useful in the epoxy adhesive composition may be prepared from any polycarboxylic acid, but particularly preferred acids are the dimer fatty acids or mixed dimer and trimer acids. Preferably such acids are prepared by polymerizing $C_{18}$ unsaturated fatty acids.

Suitable amino-terminated polyamides can also be prepared from shorter chain polycarboxylic acids. When the polycarboxylic acid is of relatively short chain, i.e., of about 2 to 8 carbon atoms, it is preferred that the amino compound with which it is pre-reacted have an alkylene ether component with a value for the integer n of about 6 or higher to provide optimum flexibility in cured products. On the other hand, when the polycarboxylic acid is a polymeric fatty acid, it is preferred that the value of n be about 6 or less. Due to cost and availability polyethylene or polypropylene glycol are preferred raw materials, and of these polypropylene glycol is generally preferred. Preferably the amino-alkylene-ether compound should be employed so as to provide at least 1.1 amino groups per carboxyl group of the polycarboxylic acid, and most preferably in an amount providing 1.5 amino groups per carboxyl group.

Small proportions of other groups may be present in the skeleton chain of the amino-terminated polyamide without interfering with the ability of the compositions to cure quickly at room temperature. Thus, for example, small amounts of the residue of ethylene diamine may be present without deleterious effect. Additionally, the adhesive composition may contain other hardeners, monoepoxides or reactive materials in small quantities.

Materials which may be substituted for the amino-terminated polyamide include diethylene triamine, triethylenetetramine, diethylaminopropylamine, meta-phenyldiamine, tris-(dimethylaminomethyl)phenol, methyldianiline, dicydiamide, phthalic anhydride, chlorendic anhydride, etc. Of these materials triethylenetetramine is useful in room-temperature curing compositions while the others generally require the use of elevated curing temperatures (e.g., 80° or above).

Silicone compositions preferred for use in the present invention comprise at least 15 percent by weight of units derived from at least one epoxy-terminated silane polymerized in the presence of catalytically active amount of highly fluorinated aliphatic sulfonic or sulfonylic catalyst. Materials copolymerizable with the epoxy and siloxane groups of the silane can be added in amounts of up to 85 percent by weight of the system.

More preferably the silanes are epoxy-terminated and may be represented by the formulae

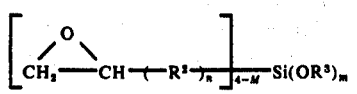 (I)

or

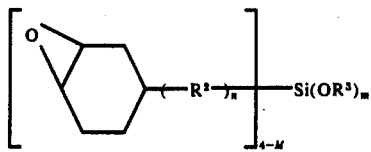 (II)

wherein $R^2$ is a non-hydrolyzable divalent hydrocarbon radical of up to 20 carbon atoms which may be aliphatic, aromatic or aliphatic and aromatic. Said hydrocarbon radical may also contain hetero atoms selected from nitrogen, sulfur and oxygen with the proviso that no two of said hetero atoms be adjacent and that the oxygen atoms be present in the form of ether linkages; $R^3$ is an aliphatic hydrocarbon radical of up to 10 carbon atoms, an acyl radical of up to 10 carbon atoms or $(CH_2CH_2O)_K Z$ wherein Z is selected from hydrogen and aliphatic hydrocarbon radicals of less than 10 carbon atoms, K is an integer of at least 1; n is zero or 1; and m is 1, 2 or 3.

The silanes may also be hydrolyzates or precondensates. Such materials may be prepared by the partial or complete hydrolysis of the —$OR^3$ groups.

The sulfonic catalyst may be the sulfonic acid or the salt thereof. It may be represented by the formula

wherein $R_f$ is a highly fluorinated, saturated monovalent radical having from 1 to 20 carbon atoms and $R^4$ is selected from hydrogen, ammonium cation and metal cation and n is the valence or $R^4$.

The $R_f$ radical may be straight or branched or, if of 3 or more carbons, cycloaliphatic. Moreover, it may be interrupted by divalent oxygen or trivalent nitrogen atoms wherein said atoms are bonded only to carbon atoms. Preferably the radical is fully fluorinated although hydrogen or chlorine may be present provided that not more than one such atom is present for each carbon atom. Most preferably the radical is a saturated perfluoroalkyl radical of from 1 to 18 carbon atoms.

The sulfonylic catalyst has two highly fluorinated sulfonyl groups attached directly to an imide or methylene. The catalyst may be represented by the formula

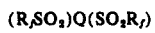

wherein $R_f$ is as defined above and Q is a divalent radical selected from $>NR^5$, $>CR^5R^6$ and $>C=CHR^7$ wherein $R^5$ is selected from hydrogen, chlorine, bromine, iodine, ammonium cations and metal cations; $R^6$ is selected from hydrogen, chlorine, bromine, iodine, $R_f SO_2—$, alkenyl of from about 3 to 5 carbon atoms, alkyl of from about 1 to 20 carbon atoms, aryl of from about 1 to 20 carbon atoms and alkaryl of from about 7 to 20 carbon atoms; and $R^7$ is selected from hydrogen, alkenyl radicals of from about 3 to 4 carbon atoms and aryl radicals of up to 20 carbon atoms.

Metals useful as the foregoing $R^2$ are preferably those inclusive of and to the left of aluminum, germanium, antimony and polonium on periodic chart of elements. Ammonium cations useful in the present invention include cations of ammonia and primary, secondary, tertiary and quaternary amines.

Blade 10 may be easily prepared. For example, a disc 12 (e.g., a circular saw blade) is provided and viscoelastic layer 14 and sheet (or constraining layer) 16 applied thereto. Alternatively viscoelastic layer 14 and sheet 16 may be provided as a single element. Such elements are commercially available from Minnesota Mining and Manufacturing Company as "Scotch Damp Saw Blade Dampeners". In any event once the viscoelastic layer and sheet have been applied, edge coating 18 is applied. The edge coating may be applied by a variety of techniques, for example, brushing, spraying, extruding, etc. It has been found useful to include a colorant (e.g., a pigment or dye) in the edge coating to more easily identify those areas to which said coating has been applied.

The edge coatings described herein represent but one embodiment of the present invention. Other embodiments are also possible as will be understood by those skilled in the art and included within the scope of the following claims.

What is claimed is:

1. A sound-damped saw blade comprising (a) a disc, (b) a layer of viscoelastic material adhered to one major surface of said disc and a thin sheet over and coextensive with said viscoelastic layer, wherein the diameter of said viscoelastic layer and said sheet is less than the diameter of said disc, and (c) an edge coating covering the circumferential edge of said viscoelastic layer and said sheet, wherein said coating has an abrasion resistance, as expressed in percentage haze, of less than about 30 percent.

2. A sound-damped saw blade according to claim 1 wherein the exposed outer peripheral edge of said sheet is tapered.

3. A sound-damped saw blade according to claim 2 wherein the exposed major surface of said sheet extends upward from said disc a distance less than do the teeth of said blade.

4. A sound-damped saw blade according to claim 3 wherein said sheet comprises tin-plated, cold-rolled steel.

5. A sound-damped saw blade according to claim 4 wherein said viscoelastic layer comprises a copolymer of about 80 to 95 parts of an alkyl acrylate having about 6–10 carbon atoms in its alkyl group and correspondingly about 20 to 5 parts of at least one monomer selected from acrylic acid, methacrylic acid, acrylonitrile, methacrylonitrile, acrylamide and methacrylamide.

6. A sound-damped saw blade according to claim 1 wherein said edge coating comprises a cured material selected from epoxy compositions and silicone compositions.

7. A sound-damped saw blade according to claim 6 wherein cured material comprises a cured mixture of (a) an epoxy resin and (b) an amino-terminated polyamide of (i) a polycarboxylic acid and (ii) a compound of the formula

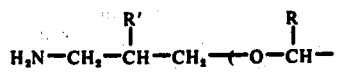

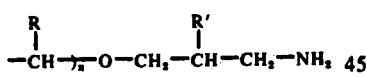

wherein $n$ is an integer of about 1 to 40, $R'$ is selected from the group consisting of hydrogen and methyl, each R is selected from the group consisting of hydrogen and alkyl, and any two R's attached to adjoining carbon atoms together contain a total of about 4 carbon atoms.

8. A sound-damped saw blade according to claim 6 wherein said cured material comprises a cured mixture of (a) an epoxy-terminated silane having the formulae

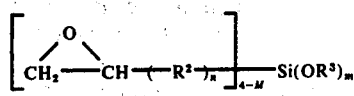

or

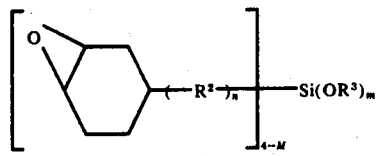

wherein $R^2$ is a non-hydrolyzable divalent hydrocarbon radical of up to 20 carbon atoms, $R^3$ is an aliphatic hydrocarbon radical of up to 10 carbon atoms, an acyl radical of up to 10 carbon atoms or $(CH_2CH_2O)_kZ$ wherein Z is selected from hydrogen and aliphatic hydrocarbon radicals of less than 10 carbon atoms, K is an integer of at least 1; $n$ is zero or one; and $m$ is 1, 2 or 3 and (b) a highly fluorinated aliphatic sulfonic or sulfonylic catalyst having the respective formulae

and

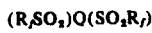

wherein $R_f$ is a highly fluorinated, saturated monovalent radical having from 1 to 20 carbon atoms and $R^4$ is selected from hydrogen, ammonium cation and metal cation, $n$ is the valence of $R^4$, and Q is a divalent radical selected from $>NR^5$, $>CR^5R^6$ and $>C=CHR^7$ wherein $R^5$ is selected from hydrogen, chlorine, bromine, iodine, ammonium cations and metal cations; $R^6$ is selected from hydrogen, chlorine, bromine, iodine, $R_fSO_2-$, alkenyl of from about 3 to 5 carbon atoms, alkyl of from about 1 to 20 carbon atoms, aryl of from about 1 to 20 carbon atoms and alkaryl of from about 7 to 20 carbon atoms; and $R^7$ is selected from hydrogen, alkenyl radicals of from about 3 to 4 carbon atoms and aryl radicals of up to 20 carbon atoms.

* * * * *